June 15, 1971 H. P. SCHANE 3,584,373
CAVITY FORMING APPARATUS AND METHOD
Filed June 30, 1969 2 Sheets-Sheet 1

INVENTOR.
HARRY P. SCHANE
BY
Edward M. Farrell
ATTORNEY

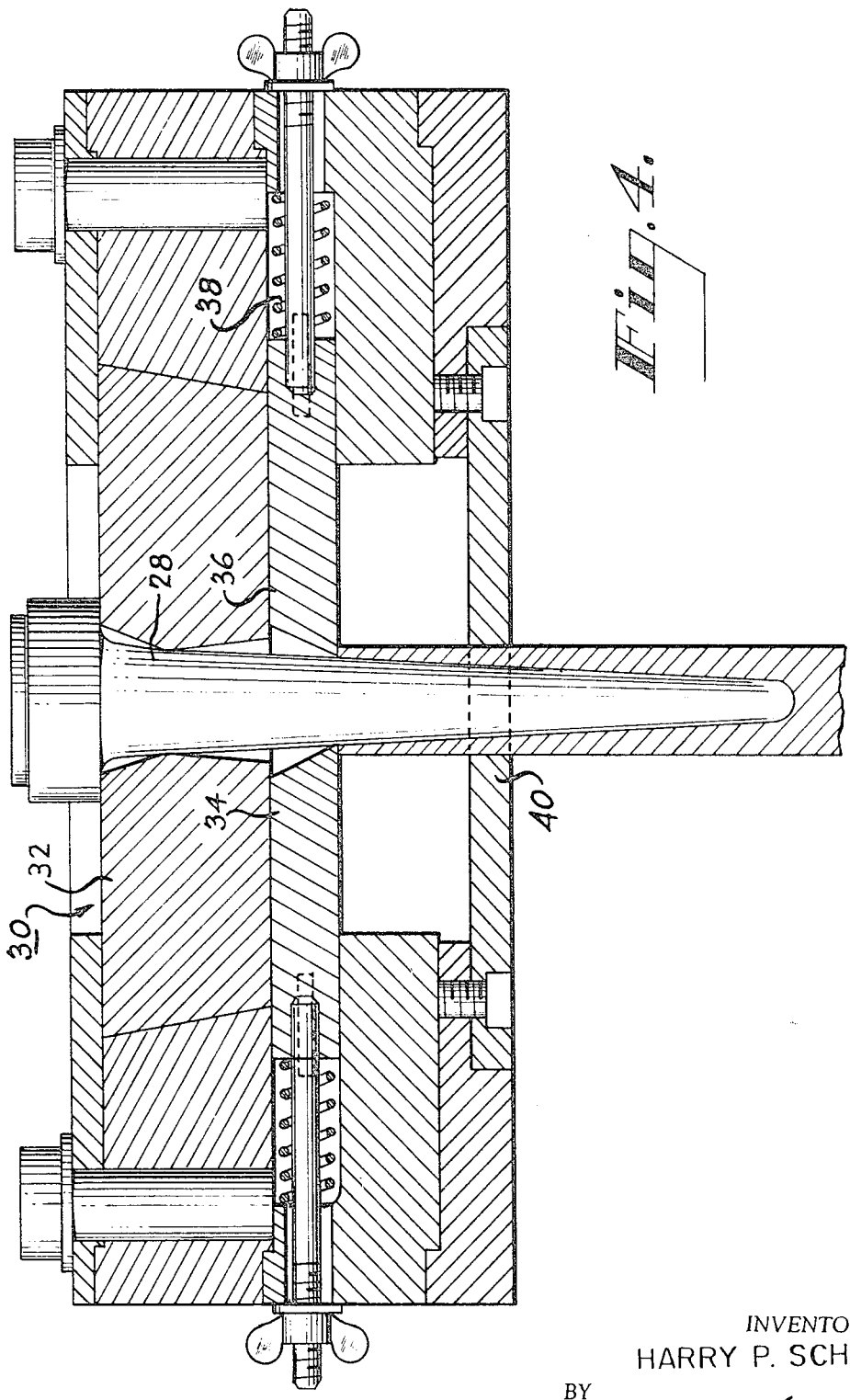

United States Patent Office 3,584,373
Patented June 15, 1971

3,584,373
CAVITY FORMING APPARATUS AND METHOD
Harry P. Schane, Lafayette Hill, Pa., assignor to
The Budd Company, Philadelphia, Pa.
Filed June 30, 1969, Ser. No. 837,455
Int. Cl. B23p 13/04
U.S. Cl. 29—557        5 Claims

ABSTRACT OF THE DISCLOSURE

A method of forming an irregular shaped cavity in a metallic member includes the steps of drilling a hole in the member. A relatively large punch is then inserted into the drilled hole to expand the hole while the metal member is subjected to heat. After the member is cooled, a second punch, conforming in size and shape to the cavity to be formed, is inserted into the expanded hole. The member is then compressed around the second punch to cause the hole to conform to the size and shape of the second punch.

---

Numerous different types of methods for forming a cavity in a metallic member have been used in the past. In the main, when cavities of irregular shapes have to be formed, machining is used to shape the cavity. Such machining is time consuming and relatively expensive especially if a large number of parts are to be formed.

It is an object of this invention to provide a novel method of forming a cavity in a metallic member.

It is a further object of this invention to provide a novel method of forming a cavity in a metallic member relatively fast and economically.

In accordance with the present invention, a method of forming a cavity in a metallic member or tube is provided. A hole is first drilled in the member. A relatively large punch is then inserted under high pressure into the hole of the member while the member is subjected to a relatively high heat. The diameter of the punch is made larger than the cavity to be ultimately formed. A second punch is then inserted into the expanded opening. The member is then compressed and ironed around the second punch to cause the hole in the metallic member to conform to the size and shape of the second punch.

Other objects and advantages of the present invention will be apparent and suggest themselves to those skilled in the art, from a reading of the following specification and claims, in conjunction with the accompanying drawing, in which:

FIG. 4 illustrates the final step in the formation of a cavity in the bar member illustrated in FIG. 1.

Figure 1:
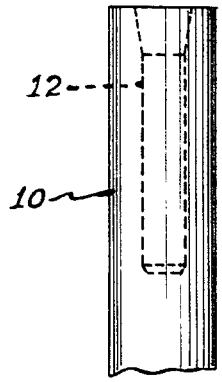
FIG. 1 illustrates a bar member, partly broken away, having a drilled hole therein.

Referring particularly to FIG. 1, a bar member 10, which may be made of steel or other metallic material, includes a drilled opening 12. The drilled opening 12 may include a slight chamfer toward the top to permit the insertion of a punch, hereinafter described. The drilled opening extends longitudinally partly into the bar member 10. FIG. 1 illustrates the bar member prior to any forming operation except for the drilled hole.

Figure 2:
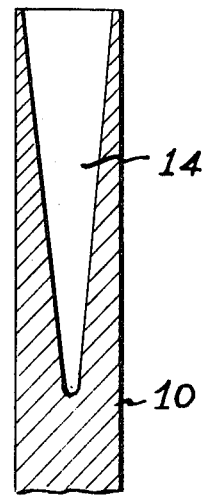
FIG. 2 illustrates a bar member, partly in cross section and broken away, having a cavity therein of a predetermined size and shape formed from the bar element illustrated in FIG. 1.

Referring particularly to FIG. 2, the bar member 10 includes a cavity 14. The cavity 14 is of an irregular shape somewhat elongated and tapered and represents one shape which may be formed in utilizing the method involved in the present invention. FIG. 2 illustrates the final form of the member 10. It is noted that the formed cavity is substantially longer than the drilled hole. The method of transforming the article illustrated in FIG. 1 to the article illustrated in FIG. 2 constitutes the present invention and will be described in detail in connection with FIGS. 3 and 4.

Figure 3:
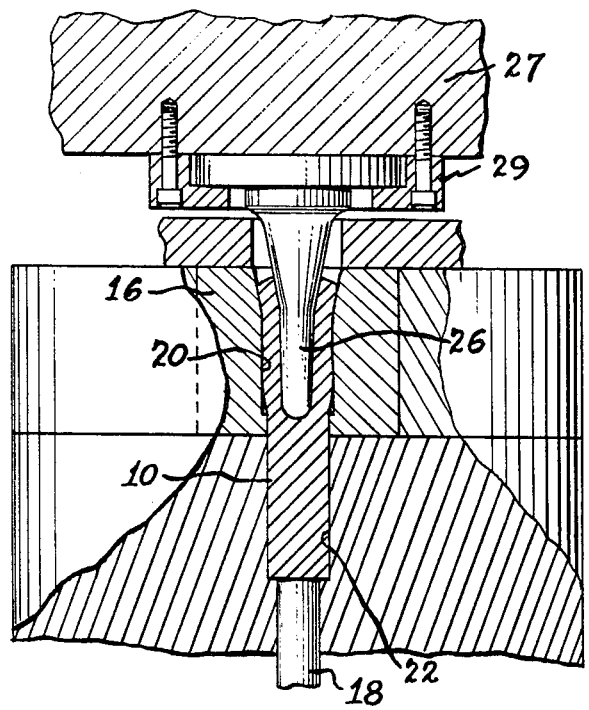
FIG. 3 illustrates a step in the forming operation of the bar member illustrated in FIG. 1.

Referring particularly to FIG. 3 the bar member 10 is inserted into a die 16. Prior to any forming operation, the bar member 10 bottoms on a knock-out plug 18. The die opening is larger toward the top area 20 than the bottom area 22. The opening toward the top area 20 is slightly tapered in the manner illustrated.

Prior to the forming operation, the bar element 10 is drilled in accordance with the illustration in FIG. 1. While it is in the die, the bar 10 is subjected to heat by induction heating or other similar means and heated to approximately 1800° F. Induction heating units are well known and are external to the die and are not illustrated.

A punch 26 may be preheated by torch heating to approximately 500° F. and then moved down into the drilled opening of the bar member 10. The punch is suitably mounted to the member 27 by means of a ring member 29. The punch 26 is much larger in diameter than the drilled hole and the cavity to be ultimately formed. Also, the punch 26 is shorter than the length of the elongated cavity to be ultimately formed.

When the punch 26 is forced under pressure into the drilled hole of the bar member 10, the wall of the bar member 10 expands and the total length of the bar member 10 shrinks slightly. Also the wall of the member bulges slightly. After the step illustrated in FIG. 3 is completed, means may be actuated to cause the knock-out plug 18 to push the partly formed metal bar 10 out of the die and make it available for the next forming step.

In carrying out the step illustrated in FIG. 3 the size of the punch employed and the material of which the member 10 is made must be considered to assure that excess forces do not cause cracking of the bar member when the punch is inserted into the drilled hole. The preheating of the punch and heating of the member 10 aid in preventing cracking of the bar as the step illustrated in FIG. 3 is carried out.

Referring particularly to FIG. 4, after the bar member 10 has been cooled, it is ready for the next step. A punch 28, longer and narrower towards its bottom than the punch 26 illustrated in FIG. 3, is inserted into the opening of bar member 10. The punch 28 is then moved downward under pressure to force the bar member 10 through a die 30. The die 30 includes a top ring 32 which is slightly tapered on two sides to receive the bar member 10 and punch 28 therethrough.

After passing the ring 32, the punch 28 forces the bar member 10 past stripper elements 34 and 36 which are normally closed by a compression spring 38. As the bar member 10 passes the stripper 34 and 36, the strippers are urged over the bar member 10 to permit the punch 28 to be moved upwardly out of the bar member 10. A ring 40 guides the bar 10 as it is moved downward.

As the punch 28 forces the bar member 10 downwardly, the outer wall of the bar member 10 is compressed by the tapered ring 32. As a result of the compression, the bar member compresses until the wall of the punch 28 is reached. At this point the bar member 10 wall is moved and becomes elongated as a result of an extruding action. At the end of the downward stroke, the interior of the bar member 10 conforms to the shape of the punch 28. In one embodiment, the drilled hole was about four and one half inches long while the formed cavity was about seven inches long.

In some cases, the step illustrated in FIG. 3 may be repeated several times with progressively larger punches when a single step might tend to split the bars. In some cases, the metal member may have to be annealed after the step of FIG. 3 prior to the step illustrated in FIG. 4.

Thus it is seen that the cavity of irregular shape may be formed relatively quickly without long and costly machining steps.

I claim:

1. A method of forming a cavity in a metallic member comprising the steps of drilling a hole in said member, inserting under pressure a first punch larger than said hole into said hole forming an expanded hole, inserting a second punch conforming in size and shape to said cavity to be formed into said expanded hole, and compressing said member around said second punch to cause said expanded hole to conform to the size and shape of said cavity.

2. The invention as set forth in claim 1 wherein the additional step is provided of heating said member during insertion of said first punch.

3. The invention as set forth in claim 2 wherein the additional step is provided of elongating said member as it is compressed around said second punch.

4. The invention as set forth in claim 3 wherein the additional step is provided of cooling said member after the expansion of said hole and prior to insertion of said second punch.

5. The invention as set forth in claim 4 wherein the additional step is provided of preheating said first punch prior to insertion into said drilled hole.

References Cited

UNITED STATES PATENTS

| | | | |
|---|---|---|---|
| 2,569,248 | 9/1951 | Miller | 72—377X |
| 2,748,464 | 6/1956 | Kaul | 72—377X |
| 2,748,932 | 6/1956 | Kaul | 72—356X |
| 2,930,483 | 3/1960 | Kaul | 72—377 |
| 3,165,199 | 1/1965 | Tlaker | 72—354X |
| 3,362,206 | 1/1968 | Bertoglio | 113—32X |

JOHN F. CAMPBELL, Primary Examiner

V. A. DI PALMA, Assistant Examiner

U.S. Cl. X.R.

72—377